July 8, 1941.   P. M. BOURDON   2,248,059
TRUCK MOUNTING FOR PNEUMATIC TIRED RAILWAY CARS
Filed March 18, 1939
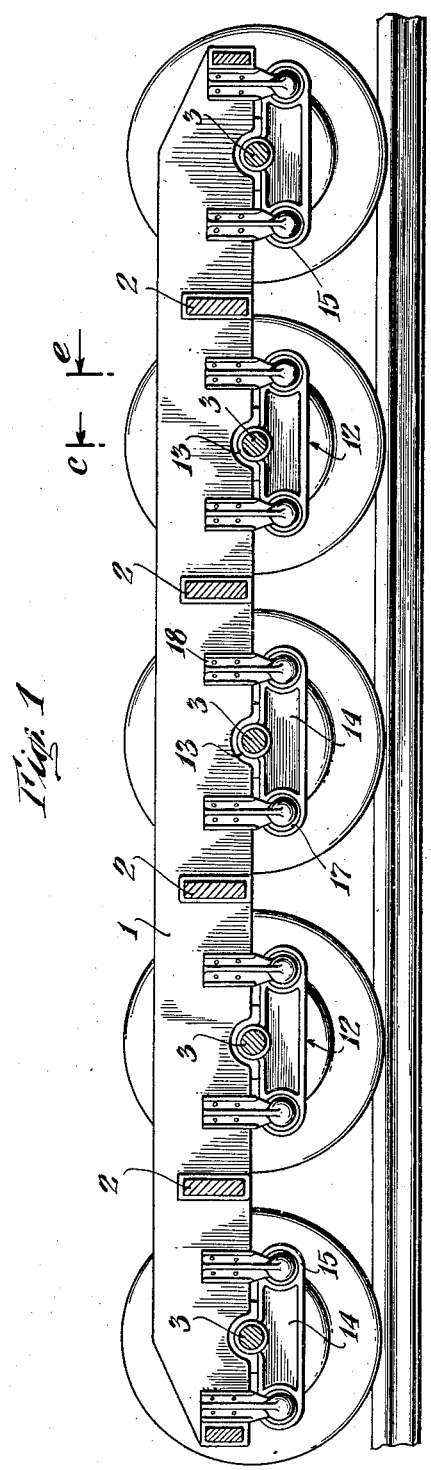
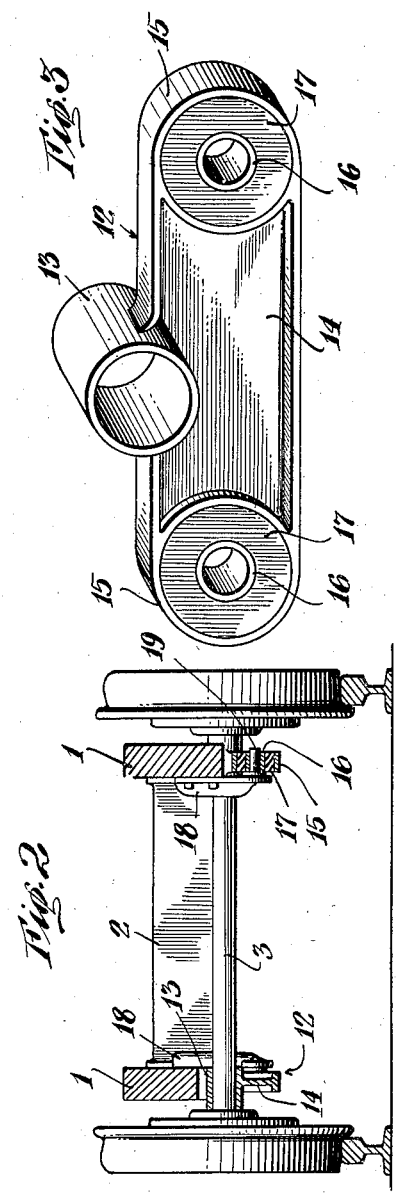
INVENTOR
Pierre Marcel Bourdon
BY
his ATTORNEYS Patented July 8, 1941

2,248,059

UNITED STATES PATENT OFFICE 2,248,059

TRUCK MOUNTING FOR PNEUMATIC TIRED RAILWAY CARS

Pierre Marcel Bourdon, Paris, France, assignor to Michelin et Cie., Clermont-Ferrand, France, a corporation of France Application March 18, 1939, Serial No. 262,617
In France April 15, 1938

1 Claim. (Cl. 105—157)

This invention relates to trucks for railway cars and particularly to axle suspensions for pneumatic tired railway cars by means of which damage to the tire, wheel or track ordinarily caused by the sudden deflation of a tire is obviated.

At present, the trucks used on pneumatic tired railway cars are similar in construction to those used on all metal-wheeled cars. That is, the frames of the trucks are supported on wheels and axles by means of springs that are interposed between the axles and the frames. Inasmuch as the springs act to maintain an equal distribution of the load on the tires, should loss of pressure occur in any one tire, the spring associated with that tire forces the deflated tire against the rail with approximately the same force as had been exerted when the tire was inflated so as to maintain the load equally distributed. The wheel drops as the tire deflates and its guiding flange will then come into contact with the bolts of the fishplates and other track equipment, thereby damaging the wheel and the track equipment.

Several devices have been developed in attempting to obviate this result. For example, there are supplemental supporting devices placed inside the tire; auxiliary wheels intended to come into operation automatically upon the failure of one of the tires; and devices intended to shift the load from a wheel having a deflated or partially deflated tire to one or more of the other wheels.

These last two devices are of complicated construction and have not proved altogether satisfactory. The supplementary supporting devices, although they have gone into wide use in the absence of anything better, suffer from the following disadvantages. It is possible to run on them for only a short time before the heat, stresses, friction and pressure exerted on the portion of deflated tire between the rail and the supporting device will completely destroy the tire. Furthermore, being of heavy construction, so as to be capable of sustaining the loads they must carry, and being spaced at a considerable distance from the axis of rotation, they greatly increase the inertia of the wheel, thus increasing the difficulty of starting and stopping the vehicle with which they are associated. They also make it difficult to balance the wheel statically and dynamically and cause excessive wear and vibration unless extreme care is used in properly balancing the wheels. In addition, they seriously complicate the problem of assembling the tire on the rim inasmuch as they must be located in the interior of the tire.

An object of the present invention is to provide trucks for pneumatic-tired railway cars having an axle suspension which prevents displacement of the wheels thereon beyond a predetermined lower position when tires on the wheels become deflated.

A further object is to provide axle suspensions for pneumatic-tired railway cars which act to absorb shocks and limit the movement of the axles and wheels and thereby prevent injury to the tires or the wheels or to the roadbed equipment when pressure is lost in one or more of the tires.

A further object is to provide a simple truck mounting for a pneumatic-tired railway car which will make possible the continued travel of the car with a deflated tire without injury to the tire or any other associated equipment, and without the use of accessory equipment of complicated nature.

The present invention consists generally of providing trucks for railway cars and other vehicles consisting of a frame resiliently supporting the vehicle or car chassis and having axles mounted therein by means of shock absorbing elements that resiliently limit the relative vertical displacement of the wheels with respect to the frame of the trucks, while allowing the axles the freedom of transverse displacement necessary to guide the trucks on the curves. The shock absorbing elements preferably are rings of rubber which allow limited movement of the axles and at the same time absorb shocks that would otherwise be transmitted to the truck frame. The chassis is supported on the trucks by means of spring suspensions interposed therebetween which further absorb road shock and improve the riding qualities of the car.

Devices of the type embodying the invention have many advantages over prior types of axle suspensions. For example, elimination of springs between the axles and the frame of the truck makes it possible to greatly simplify and rigidify this frame and to reduce its weight by eliminating the parts which are necessary for fastening the springs and axle guards thereto.

Safety devices inside of the tire are rendered unnecessary, balancing of the rotating assemblies is facilitated, and the wheel assemblies are made lighter in weight, which reduces the forces of inertia.

The tires are permitted to flex to a greater extent inasmuch as they are not limited by an inner safety device. Therefore, the tires either inflated or deflated will not be hammered between the rail and the inner safety device. Likewise, by eliminating such safety devices in the tires, mounting of the pneumatic tire on its rim is greatly facilitated.

The upkeep and the lubrication of the trucks are greatly simplified on account of the absence of springs between the axles, the frames and axle guards which wear rapidly and demand a frequent lubrication.

Mounting of such members as short circuiting contact fingers for the signal control, third rail contact shoes, and cow catchers or rail guards which must remain constantly in contact with the rails or must remain at a height approximately constant with respect to the track, is facilitated because the vertical distance between the rail and the frame of the truck remains practically constant.

For a better understanding of the present invention, reference may be had to the accompanying drawing, in which:

Figure 1 is a longitudinal sectional view along the axis of a form of truck embodying the present invention;

Figure 2 is a sectional view taken along the line c—d passing through the left side of the truck shown in Figure 1, and along the line e—f passing through the right side of the truck; and Fig. 3 is a perspective view on a larger scale of the suspension device of the truck of Figure 1.

As shown in Figures 1 to 3, a typical form of truck includes a frame formed of spaced, longitudinally extending girders 1 which are connected by a plurality of cross-members 2 and are supported on a plurality of axles 3. Five axles 3 are illustrated but more or less than five may be used, as may be found desirable.

Each axle 3 is connected to the frame by means of a suspension member 12. This member is provided, for its attachment to the axle 3, with a ring or sleeve 13 which is disposed at the upper center part of a link or member 14, of I cross-section. The member 14 has an outer ring 15 and an inner ring 16 at each of its ends which are separated by a rubber ring 17 which is attached to the same during vulcanization. The member 14 may be suspended from the girders 1 in any desired way, for example, by means of the lugs 18 mounted on the girder and provided with a horizontal shaft 19 on which the inner ring 16 is mounted.

In this device the axle is supported at each of its ends by means of the two rubber rings 17, which support the axle for resilient displacement vertically and axially. Likewise, when the sleeve 13 is fixed to the axle 3, limited rotational movement of the axle under the action of the braking or other torques is permitted, but this movement is smaller than in previous devices, which have a spring suspension. It will be understood that the sleeve 13 may be used as a bearing for the axle if so desired, provided that lubricating means is provided. With devices of the type described above, if the pressure decreases in a tire, the corresponding wheel will be released from its load and will remain suspended from the girder without being able to drop to any considerable extent, thus preventing damage to the wheel, tire or track.

It will be understood that the device which has been described above can be changed or modified in many particulars without departing from the invention. It will also be understood that devices embodying the invention may be applied to chassis of vehicles which are not mounted on trucks. Therefore, this form of the invention disclosed herein should be considered as illustrative, only, and not as limiting the scope of the following claim.

I claim:

In a truck for pneumatic-tired vehicles, having a rigid truck frame and at least three wheel receiving axles associated with said frame, in combination with the truck frame, means for relieving a wheel having a deflated tire thereon of its proportionate share of the weight of the truck and vehicle comprising an elongated rigid link disposed adjacent each end of each axle having a substantially centrally located aperture for receiving an axle and apertures adjacent each end thereof parallel to said centrally located aperture, rubber rings fixed in the apertures adjacent the ends of said links and lugs fixed to said truck frame disposed in and fixed to said rings.

PIERRE MARCEL BOURDON.